Feb. 5, 1963

K. H. WYCOFF 3,076,939

TONE CONTROL CIRCUITS

Filed Sept. 6, 1960

2 Sheets-Sheet 1

INVENTOR.
KEITH H. WYCOFF
BY
Brangley, Baird, Clayton, Miller & Vogel
ATTYS.

INVENTOR.
KEITH H. WYCOFF
BY
Prangley, Baird, Clayton, Miller & Vogel
ATT'YS.

3,076,939
Patented Feb. 5, 1963

3,076,939

TONE CONTROL CIRCUITS

Keith H. Wycoff, Overton, Nebr.

Filed Sept. 6, 1960, Ser. No. 54,096
18 Claims. (Cl. 328—137)

This invention relates in general to tone control circuits for use in the control of functions from a remote point, the transmission of the control tone signals being either by radio or by wire circuits.

Control circuits are used to perform numerous tasks, such as the control of model airplanes, the control of drone airplanes, the selection of lines in a telephone system, the operation of relay systems, the selective calling of radio receivers, etc. The tone control circuits used heretofore in some instances have been complex, requiring multiple tones for the activation of one output circuit, or the use of multiple tones for the control of several output functions. All of the prior systems including these complex systems, however, are made up of a combination of one or more simple tone control circuits which can be generally classified into three types.

The first type of simple tone control circuit utilized heretofore employed only a sharp band pass or band elimination filter, the output of which was used to control various functions, the activation of the control circuit depending both upon the character of the input voltage and upon the characteristics of the filter. This first type of simple tone control circuit will produce some output control voltage when "noise" is fed thereto, the term "noise" hereafter being used to include all signals other than the control signal which should activate the control circuit and can include, for example, speech, control tones for other circuits, atmospheric noise, static, etc. If the amplitude of the noise fed to the first type of prior art tone control circuit is great enough, the circuit may produce an output voltage that is not desired, i.e., the tone control circuit is activated by the noise. Thus, when there are present in the channel over which control is being exercised, frequencies other than the tone control frequency, the level of the input should be limited to prevent "false" operation of the tone control circuit.

In a second type of prior art tone control circuit, the voltages present in the control channel are applied simultaneously to two paths, the outputs of the two paths being connected in opposition. For example, in a tone controlled radio receiver, the audio output may be applied simultaneously to a band pass filter which passes a narrow range of frequencies at the tone control frequency (i.e., the resonance frequency of the filter is the tone control frequency), and also to a noise filter which passes a broad range of frequencies which are expected to be present in the control channel and in certain cases including the tone control frequency. These two outputs are then rectified and the output of the noise filter can be used as a bias voltage which must be exceeded by the output from the tone filter before any control voltage is obtained from the tone control circuit. In this type of circuit, the frequency range over which a control voltage will be present is determined only by the relative outputs of the two filters at the selective frequencies thereof. There will be no output voltage from the tone control circuit tending to perform the control function unless the tone applied is within the specified frequency range regardless of the strength of the signal.

A third type of prior art tone control circuit is a variation of the second type explained above and in the third type connections are made so that the difference between the output voltages from the two filters is obtained to provide the control voltage output. As an example, the output of the noise fitler may be rectified and the output of the tone filters may be rectified separately therefrom. The rectified voltages are then connected in opposition to each other so that the output control voltage obtained is the difference voltage. If the noise voltage output equals the tone voltage output, the resultant output control voltage will be zero. If the output voltage from the noise filter exceeds that from the tone filter, the control voltage may, for example, be negative and, conversely, if the output voltage from the tone filter exceeds that from the noise filter, the output control voltage will be positive. This third type of tone control circuit possesses definite advantages over the second type of tone control circuit described above and especially when it is desired to incorporate a time delay action in the tone control circuit. It has been common practice heretofore to employ time delay as a part of tone control circuits to prevent false actuation thereof by spurious short impulses, by frequency distortion product signals, etc. In general, when a time delay circuit is incorporated in the tone control circuit, more control voltage will be stored therein when the average level of the noise present in the input channel is greater, thus tending to prevent false actuation of the tone control circuit by spurious transit voltages. This type of action has been found of particular value in the case of tone controlled radio receivers where the speech present in the input channel may contain harmonics or distortion products including the control tone frequency. Although these spurious voltages at the control tone frequency will be greater when the input channel is louder, the probability of false actuation of the tone control circuit is not appreciably increased since the stored control voltage will be greater with louder speech.

Several variations of the above three basic types of tone control circuits have been employed heretofore in an effort to provide improved operation characteristics and especially to limit false actuation thereof. One circuit utilized heretofore has employed a fixed D.C. bias voltage instead of the rectified output of the noise filter as described in the second and third types of tone control circuits discussed above, this method being simpler but generally inferior to the circuits of types two and three described above.

In spite of the advances made heretofore in tone control circuitry, the tone control circuits available heretofore have left much to be desired and incorporate therein certain inherent disadvantages. For example, a radio receiver controlled by a control tone can still be falsely actuated by spurious signals at the control tone frequency including ordinary speech and if the receiver is adjusted so that it will not be thus falsely actuated, it will not operate with weak tone control signals; or if a long time delay is relied upon to prevent false actuation, the time delay must be so long so as to operate the rectiver in an unsatisfactory manner, or operation of the receiver is very fast when strong tone control signals are applied thereto and the operation of the receiver is very slow when weak tone control signals or spurious signals at the control tone frequency are applied thereto.

Accordingly, it is an important object of the present invention to provide an improved and simple tone control circuit that cannot be falsely actuated by speech or other spurious signals at the control tone frequency.

Another object of the invention is to provide an improved and simple tone control circuit having a substantially constant time delay in its operation when either a strong tone control signal or a weak control signal is applied thereto.

Yet another object of the invention is to provide an improved low cost, dependable tone control circuit having sharp selective response characteristics.

Still another object of the invention is to provide an improved tone control circuit which produces a greater output voltage for control purposes with a given strength of tone control signal input thereto than do prior art tone control circuits.

Yet another object of the invention is to provide an improved tone control circuit suitable for selectively calling radio receivers or other devices on speech channels.

A further object of the invention is to provide an improved tone control circuit that will not respond to signals at the control tone frequency if the signals have an insufficient duration, regardless of the intensity thereof.

Further features of the invention pertain to the particular arrangement of the elements of tone control circuits whereby the above outlined and additional operating features thereof are attained. The invention, both as to its organization and method of operation together with further objects and advantages thereof will best be understood by reference to the following specification taken in connection with the accompanying drawings, in which.

Figure 1:
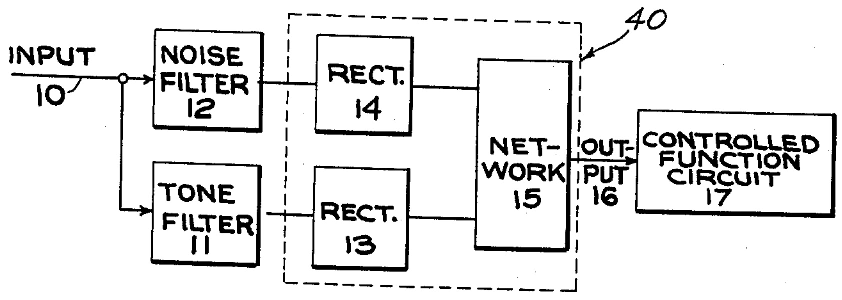
FIGURE 1 is a block diagram of a tone control circuit in which the present invention may be incorporated.

Referring to FIG. 1 of the drawings, there is shown in block form a schematic diagram in which the principles of the present invention can be incorporated. More specifically, the tone control circuit of FIG. 1 includes an input circuit or channel designated by the numeral 10 which has the output thereof connected to the input of a tone filter 11 and the input of a noise filter 12. The output of the tone filter 11 is fed to a rectifier 13 and the output of the noise filter 12 is fed to a rectifier 14, the outputs of the rectifiers 13 and 14 being combined in a network 15 to produce therefrom an output voltage at 16, the rectifiers 13 and 14 and the network 15 comprising an output network 40. The output voltage on the conductor 16 is fed to the input of a circuit 17 which is to be controlled by the control tone in the input circuit 10.

Figure 2:
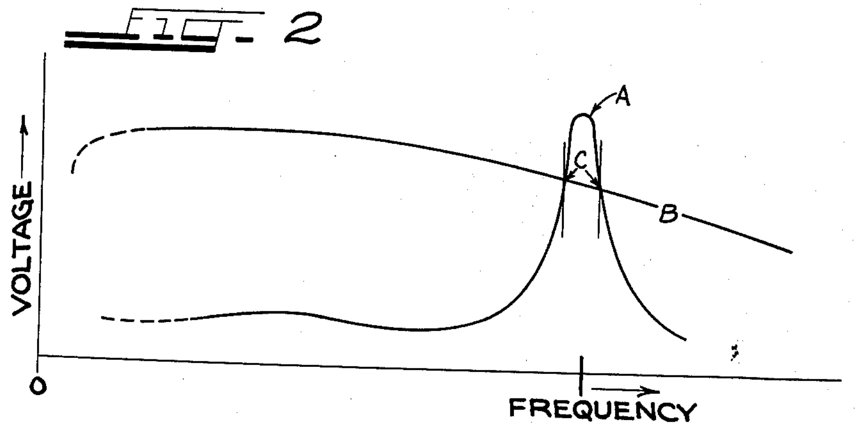
FIG. 2 is a graph showing a possible series of values of output voltages obtained from the rectifiers forming a part of the circuit of FIG. 1.
Figure 3:
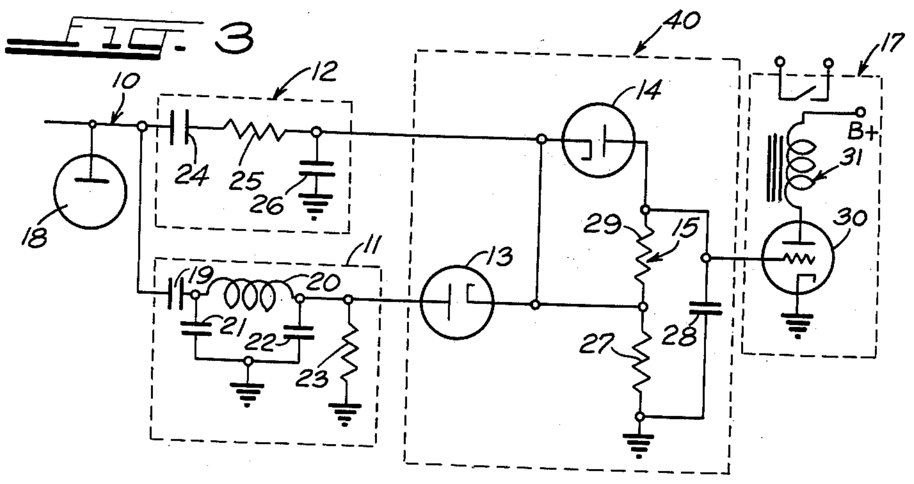
FIG. 3 is a schematic diagram of one preferred embodiment of a tone control circuit made in accordance with and embodying the principles of the present invention therein.

There is shown in FIG. 3 of the drawings a complete schematic diagram of a first embodiment of a tone control circuit made in accordance with an embodying the principles of the present invention therein and arranged generally as illustrated in FIG. 1 of the drawings. The input signal for the input circuit 10 may be derived from a vacuum tube 18, the output of the vacuum tube 18 being connected to the input terminals of the tone filter 11 and and the noise filter 12. The tone filter 11 includes a blocking capacitor 19 having one terminal thereof connected to the input terminal of the tone filter 11 and having the other terminal thereof connected to one of the terminals of an inductor 20 and a capacitor 21. The other terminal of the inductor 20 is connected to one terminal of a capacitor 22 and the other terminals of the capacitors 21 and 22 are connected to each other and to ground. The connection between the inductor 20 and the capacitor 22 is connected to one terminal of a resistor 23 having the other terminal grounded and to the anode of the rectifier 13. The tone filter 11 is connected and has values of the various components thereof so that a relatively narrow band of frequencies centered about the selected control tone frequency is passed thereby from the input circuit 10 to the rectifier 13, the frequencies passed by the tone filter 11 being diagrammatically illustrated by the curve A in FIG. 2 of the drawings.

The input circuit 10 is also connected to the input terminal of the noise filter 12 whereby the signal from the vacuum tube 18 is fed thereto. A blocking capacitor 24 is provided within the noise filter 12 and having one terminal thereof connected to the input terminal of the noise filter 12 and having the other terminal thereof connected to a resistor 25. The other terminal of the resistor 25 is connected to the output terminal of the noise filter 12 and is also connected to one terminal of a capacitor 26, the other terminal of the capacitor 26 being grounded. The noise filter 12 is adapted to pass all frequencies over a relatively broad band including the selected control tone frequency whereby the frequencies passed by the noise filter 12 may be represented by the curve B in FIG. 2 of the drawings.

The output terminal of the noise filter 12 is connected to the cathodes of both of the rectifiers 13 and 14 whereby the cathodes of the rectifiers 13 and 14 are also connected to each other. The rectifiers 13 and 14 together with the network 15 define the output network 40 which is enclosed within the dashed lines and labeled by the numeral 40, the output from the tone filter 11 being connected to the first input terminal of the output network 40 and the output terminal of the noise filter 12 being connected to the second input terminal of the output network 40. Within the output network 40, the first input terminal thereof is connected to the anode of the rectifier 13 and the second input terminal thereof is connected to the cathodes of the rectifiers 13 and 14 which are also connected to each other. The network 15 is essentially a time delay circuit and includes a resistor 27 having one terminal thereof connected to ground and the other terminal thereof connected to the common connection between the cathodes of the rectifiers 13 and 14. The common connection between the cathodes of the rectifiers 13 and 14 is also connected to one terminal of a resistor 29, the other terminal of the resistor 29 being connected to the anode of the rectifier 14, whereby the resistors 27 and 29 are connected in series between the anode of the rectifier 14 and ground. Connected in parallel with resistors 27 and 29 is a capacitor 28 having one terminal thereof connected to the anode of the rectifier 14 and having the other terminal thereof connected to ground potential.

The output terminal of the output network 40 is connected to the anode of the rectifier 14 and feeds the output from the output network 40 to the input terminal of the controlled function circuit 17 on the conductor 16. In the form of the circuit 17 illustrated in FIG. 3 of the drawings, the input thereto is connected to the control grid of the vacuum tube 30 having the cathode thereof grounded and having the anode thereof connected to one terminal of the coil of a relay 31, the other terminal of the coil of the relay 31 being connected to a B+ supply. The contacts of the relay 31 are normally open and are closed when the conduction through the tube 30 produces a field about the coil of the relay 31 sufficient to move the relay contacts to a closed position, whereby to complete a circuit to be controlled, not shown.

In the operation of the tone control circuit illustrated in FIG. 3, both the control tone and noise may be present in the input circuit 10. Assuming that only a noise signal is present in the input circuit 10, the output from the noise filter 12 will include any of the frequencies present therein within the freqency band illustrated by the curve B in FIG. 2 and when applied to the cathodes of the rectifiers 13 and 14 will cause conduction thereof on the negative portions of the input signal whereby to cause conduction of the rectifier 14 through the resistors 27 and 29 shunted by the capacitor 28 to charge the capacitor 28 to a relatively high negative potential. The conduction through the rectifier 13 will be relatively small, the conduction through the rectifier 13 tending to decrease the potential on the capacitor 28. The negative potential on the capacitor 28 will be connected by the conductor 16 to the control grid of the tube 30 whereby to decrease the conduction thereof through the coil of the relay 31 and to open the contacts of the relay 31. The circuit 17 will therefore remain in a first condition in which the contacts of the relay 31 are open as long as only a noise signal is fed through the input circuit 10.

If a control tone of a proper frequency is applied through the input circuit 10 to the input terminals of the tone filter 11 and the noise filter 12, an increased signal will be applied to the anode of the rectifier 13 and to the cathode of the rectifier 14. The control tone will pass through the noise filter 12 and immediately will increase the conduction of the rectifier 14 thereby to drive the potential on the capacitor 28 and the output conductor 16 even further negative and in a direction to interrupt operation of the circuit 17, the capacitor 28 presenting substantially a short circuit to audio frequencies of the type utilized for the control tone. The control tone signal will simultaneously be fed to the anode of the rectifier 13 and will cause conduction thereof on the positive portions of the cycles whereby to draw current through the resistor 27 and the rectifier 13. The resistance of the resistor 27 is substantially greater than the capacitive impedance of the capacitor 28 and accordingly the response through the tone channel will be slower than the response through the noise channel. Eventually the conduction of the rectifier 13 will be sufficient to begin discharge of the capacitor 28 whereby to apply a signal to the output of the control network 40 of a character tending to cause conduction of the vacuum tube 30. If the circuit parameters are selected so that grid current is drawn from the tube 30 through the resistor 29 and the rectifier 13, conduction of the rectifier 14 will be interrupted, whereby the potential applied to the output of the control network 40 will be determined only by the tone control signal generated by the conduction of the rectifier 13. In this regard it is to be noted that it is important that the common connection between the cathodes of the rectifiers 13 and 14 is at a point within the output network 40 that can vary in potential with respect to ground.

Accordingly, it will be seen that immediately after the introduction of a control tone into the input circuit 10, the output voltage from the output network 40 is actually driven further negative and in a direction to cut off conduction for the tube 30, and only after a suitable time delay during which the control tone is continuously applied will the rectifier 13 assume control of the output network 40 to raise the potential of the output to a point to permit heavy conduction of the tube 30. This results substantially from the fact that the capacitive reactance of the capacitor 28 at the control tone frequency is substantially smaller than the resistance of the resistors 27 and, accordingly, the total impedance in the charge path for the capacitor 28 and the rectifier 14 tending to drive the output negative is substantially less than the impedance in the discharge path for the capacitor 28 through the rectifier 13 tending to change in a positive direction the output potential of the network 40, so that the time delay through the noise channel is substantially less than the time delay through the control tone channel. Consequently, there will be an appreciable time delay between the application of a control tone or a noise at the control tone frequency in the input circuit 10 and the production of a positive going output from the output network 40, whereby to give substantially greater protection against false activation by spurious signals at the control tone frequency. As a result of the above described operation of the output network 40 in which the negative potential on the output conductor 16 is driven further negative initially upon the receipt of a strong signal at the control tone frequency and is driven positive only after a definite time delay, the tone control circuit of FIG. 3 provides an unusually strong rejection of spurious signals of relatively short duration and impulses at the control tone frequency, regardless of the strength or amplitude thereof.

The above described operation of the circuit of FIG. 3 is graphically illustrated in FIG. 2 of the drawings wherein the output of the noise filter 12 is indicated by the curve B and the output from the control tone circuit is that illustrated by the curve A. The control tone serves to provide a positive going output from the network 40 when the frequency thereof lies between the transition points indicated by the letter C in FIG. 2, points C being the points where the curve A crosses the curve B.

One set of suitable values of the circuit elements illustrated in FIG. 3 when a control tone of 1200 cycles is utilized is as follows:

| | |
|---|---|
| Condenser 19 | 1500 mmf. |
| Inductance 20 | 1.5 H, Q–60. |
| Condenser 21 | .02 mf. |
| Condenser 22 | .02 mf. |
| Resistor 23 | 1 megohm. |
| Condenser 24 | .05 mf. |
| Resistor 25 | 150,000 ohms. |
| Condenser 26 | 4000 mmf. |
| Resistor 27 | 1 megohm. |
| Condenser 28 | 1 mf. |
| Resistor 29 | 5 megohms. |
| Tube 30 | ½=12AT7. |
| Relay 31 | 5000 ohms, 80 mw. |
| Rectifiers 13 and 14 | 6AL5. |

It is to be understood that other types of filter circuits may be used in place of the filters described. Also, a wide range of values may be employed in the connecting network to give various speeds of reaction to the application of a control tone, to give different tone sensitivities, or to operate other special circuits in place of that illustrated by the numeral 17, etc. Although the rectifiers 13 and 14 have been illustrated as vacuum tubes, it is to be understood that other types of rectifiers including solid state devices may be used in place thereof.

Figure 4:
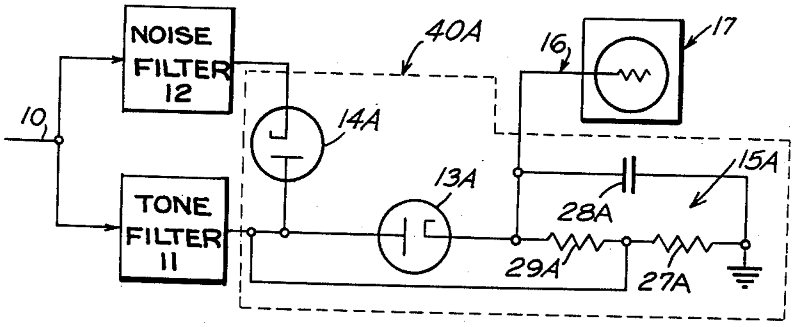
FIG. 4 is a simplified schematic drawing of a second embodiment of a tone control circuit made in accordance with and embodying the principles of the present invention therein.

There is shown in FIG. 4 of the drawings a second preferred embodiment of a tone control circuit incorporating therein the principles of the present invention. Like reference numerals have been used to designate the same parts where connected in a like manner and the suffix letter "A" has been applied to those parts which are connected in a different manner. In this form of the invention it will be seen that the anodes of the rectifiers 13A and 14A have been connected together with the output of the noise filter 12 connected to the cathode of the rectifier 14A and the output of the tone filter 11 being connected to the common anode connection. The output conductor 16 is connected to the cathode of the rectifier 13A. As a result the noise channel now operates and reacts more slowly than does the tone channel. It further is to be noted that there will be a tendency to draw a grid current from the tube in the function circuit 17 (which may be for example the tube 30 illustrated in FIG. 3) when the rectifier 13A is conductive since the tube will represent a low impedance path shunting the capacitor 28A. As a result, when the output from the tone filter 11 exceeds the output from the noise filter 12, the voltage developed tending to cause operation of the circuit 17 will be less than that generated in the circuit of FIG. 3 assuming that like values of circuit parameters and like amplitudes of noise and tone signals are applied.

Figure 5:
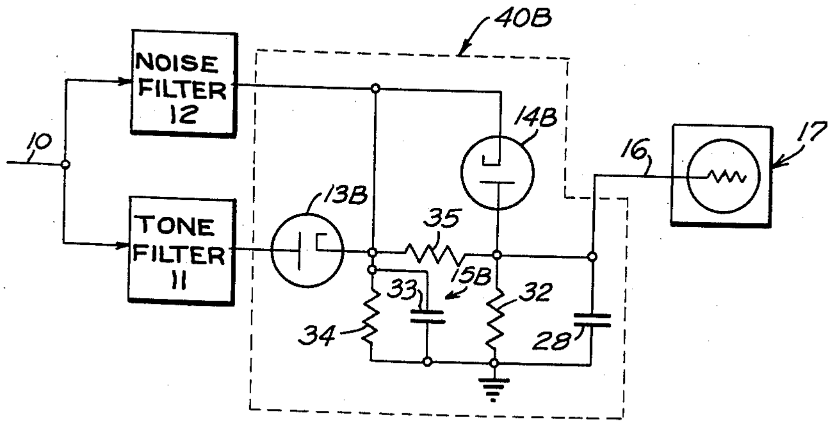
FIG. 5 is a simplified schematic diagram of a third embodiment of a tone control circuit made in accordance with and embodying the principles of the present invention.

There is shown in FIG. 5 of the drawings a third preferred embodiment of the invention which is a modification of the tone control circuit illustrated in FIG. 3. Like reference numerals have been applied to parts which have been connected the same as in FIG. 3 and like parts connected in a different manner have had the letter suffix "B" applied thereto. The cathodes of the rectifiers 13B and 14B are connected to each other and to the output from the noise filter 12. The output from the tone filter 11 is connected to the anode of the rectifier 13B and the anode of the rectifier 14B is connected to the output conductor 16. In this form of the invention the common connection between the cathodes is connected to one terminal of a resistor 34 (1 megohm) which has the other terminal thereof connected to ground and to one terminal of a capacitor 33 (0.02 mmf.) having the other terminal thereof connected to ground, the capacitor 33 smoothing the output of the rectifier 13B. The common cathode connection is further connected to one terminal of a resistor 35 (220,000 ohms) having the other terminal thereof connected to the conductor 16 and to the anode of the rectifier 14B. Another resistor 32 (2 megohms) is provided having one terminal connected to the anode of the rectifier 14B and the other terminal thereof connected to ground. The capacitor 28B is connected from the anode of the rectifier 14B to ground. The output voltage appears across the capacitor 28B and the resistor 32 in parallel, and when only a noise signal is applied to the output network 40B, a negative potential is developed on the output conductor 16. When a control tone of the proper frequency is applied through the input circuit 10, the output from the tone filter 11 will eventually exceed the output from the noise filter 12 and will charge the capacitor 33 to a potential developed across the resistor 34. The rectifier 14B will now stop rectifying due to the voltage developed by the rectifier 13B at the junction of the resistors 32 and 35 to which the anode of the rectifier 14B is connected. The capacitor 28 will discharge toward ground potential and will then charge in a positive direction due to the current flowing through the rectifier 13B and the resistor 35.

The resistor 35 in another preferred embodiment of the invention may be made variable so that the time delay of the network 15 can be adjusted to provide for a longer or shorter time delay between the application of the control tone to the input circuit 10 and the actuation of the function circuit 17.

Figure 6:
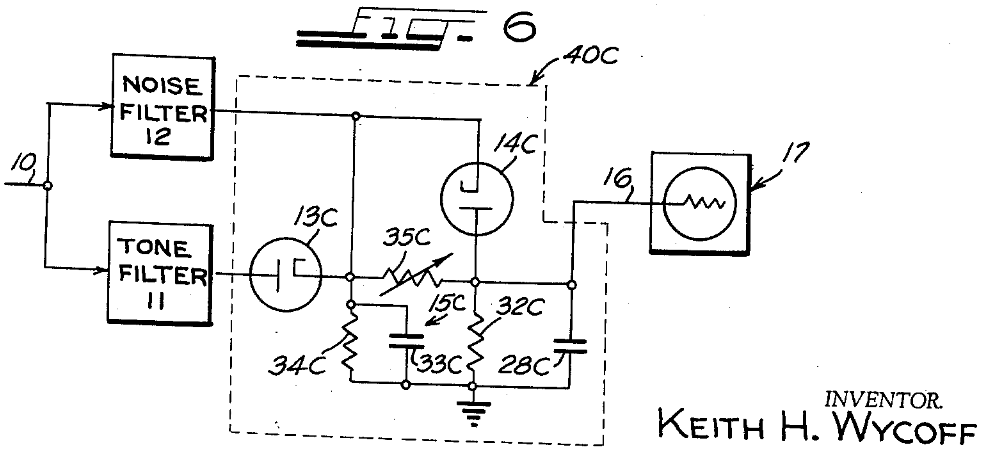
FIG. 6 is a simplified schematic diagram of yet another embodiment of a tone control circuit made in accordance with and embodying the principles of the present invention.

Such a circuit is illustrated in FIG. 6, all parts of the circuit in FIG. 6 being identical to like parts in the circuit of FIG. 5 with the exception of the resistor 35, and accordingly like reference numerals have been applied with the addition of the suffix "C" thereto. The variable resistor 35C connected between the cathode of the rectifier 13C and the anode of the rectifier 14C is a part of the time delay circuit and, accordingly, the time delay of the network 15C can be adjusted to provide a longer time delay by increasing the resistance of the variable resistor 35C and can be adjusted to provide a shorter time delay by decreasing the resistance of the variable resistor 35C.

In each of the tone control circuits illustrated in FIGS. 3, 4 and 5 of the drawings, the connections among the parts have been such that a positive output voltage has been developed on the conductor 16 to actuate the controlled function circuit 17 upon the presence of a proper control tone in the input circuit 10. Should a negative control voltage be desired on the conductor 16 in place of the positive voltage described above, it may be obtained by reversing the anode and cathode connections of each of the rectifiers 13 and 14. For example, in another preferred embodiment of the invention, the output network 40 of FIG. 3 is modified by reversing the anode and cathode connections of the rectifier 13 so that the cathode thereof is connected to the output of the tone filter 11 and the anode thereof is connected to the junction of the resistors 27 and 29. Likewise the anode and cathode connections of the rectifier 14 are reversed so that the cathode thereof is connected to the output conductor 16 and the anode thereof is connected to the junction of the resistors 27 and 29, whereby the anodes of the rectifiers 13 and 14 are connected to each other and to the output of the noise filter 12. In addition the mode of operation of the relay 31 is altered so that the contacts thereof are held open when there is current through the coil thereof. In the above described circuit, the output on the conductor 16 is positive when a noise signal is present in the input circuit 10 and no control tone is present therein, so that the tube 30 is conducting heavily through the coil of the relay 31 to hold the contacts thereof open. Upon receipt of a suitable control tone in the input circuit 10, the output on the conductor 16 is driven in a negative direction, after a suitable time delay, and eventually the current through the coil of the relay 31 will not be sufficient to hold the contacts open and they will close, thereby to actuate the circuit 17. This circuit affords "fail safe" operation since any failure of the tube 30 or the coil of the relay 31 will close the contacts thereof to insure operation of the circuit 17 pending repair thereof. All of the above described circuits in all other respects operate substantially in the same manner as the circuit described above in respect to FIG. 3 whereby to achieve all the important advantages described with respect thereto.

The connections of the outputs of the tone filter 11 and the noise filter 12 to the input terminals of the output network 40, 40A and 40B of the tone control circuits of FIGS. 3, 4 and 5, respectively, can be reversed, if desired, so that the longer time delay of the network 15 can be applied to the output of the tone filter 11 or to the output of the noise filter 12. In the tone control circuits of FIGS. 3 and 5 of the drawings, the time delay of the network 15 is applied to the output of the tone filter 11, whereas in the tone control circuit of FIG. 4, the longer time delay has been applied to the output of the noise filter 12. In those instances in which it is desired that momentary loss of the control tone will not interrupt the operation of the circuit 17 unless the loss persists for a predetermined time, then the tone control circuits of FIGS. 3 and 5 can be modified by reversing the connections of the outputs of the filters 11 and 12 to the output network 40, so that the longer time delay of the network 15 is applied to the output of the noise filter 12. Likewise, the output connections of the filters 11 and 12 in the tone control circuit of FIG. 4 can be reversed so that the longer time delay of the network 15 is applied to the output of the tone filter 11.

This application is a continuation-in-part of abandoned application Serial No. 715,235 filed February 14, 1958 for Tone Control Circuits.

Although there has been illustrated and described certain preferred embodiments of the invention, it is to be understood that various changes and modifications can be made therein without departing from the spirit and scope of the invention and it is intended that all such changes and modifications be covered as fall within the scope of the appended claims.

What is claimed is:

1. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and to a point in said output network that can fluctuate with respect to ground potential, the first input terminal of said output network being connected to one of the terminals of one of said rectifiers, the other terminal of the other of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

2. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other, the like terminals of said rectifiers also being connected to the first input terminal of said output network, the other terminal of one of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

3. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers each having an anode and a cathode, the cathodes of said rectifiers being connected to each other and also being connected to said first input terminal of said output network, the anode of one of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

4. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and a cathode, the cathodes being connected to each other and also being connected to said second input terminal of said output network, the anode of the first of said rectifiers being connected to said first input terminal of said output network, said noise channel being operative when noise is present in the input circuit to provide the input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

5. A tone control circuit for use in a communication receiver including an input circuit adapted to have both a control tone and noise therein and a function circut to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers each having an anode and cathode, said anodes being connected to each other and also being connected to the first input terminal of said output network, the cathode of one of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

6. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and a cathode, said anodes being connected together and also being connected to said first input terminal of said output network, the cathodes of the first of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

7. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an otuput terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and to a point in said output network that can fluctuate with respect to ground potential, the other terminal of one of said rectifiers being connected to said first input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner, and a time delay circuit in said output network operatvie to render said output network responsive to one of said channels only after the application of an input from the input circuit to said one channel for a predetermined period of time.

8. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other, the like terminals of said rectifiers also being connected to the first input terminal of said output network, the other terminal of one of said rectifiers being connected to said second input terminal of said input network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner, and a time delay circuit in said output network operative to render said output network responsive to one of said channels only after the application of an input from the input circuit to said one channel for a predetermined period of time.

9. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and a time delay network connected to said like terminals and adapted to have the output thereof connected to the associated function circuit to be controlled, the other terminal of one of said rectifiers being connected to said second input terminal of said output network and the other terminal of the other of said rectifiers being connected to said time delay network, said noise channel being operative when noise is applied thereto from the input circuit to provide an input to said output network that causes operation of said output network to provide after a predetermined time delay a first output voltage therefrom having an ampltiude proportional to the output of said noise channel and tending to increase in a first sense when the input to said noise channel is increased whereby it is effective to control the function circuit in a first manner, said tone channel being operative when the control tone is applied to the input circuit to provide an input to said output network that causes operation of said output network to provide after another predetermined time delay a second output voltage therefrom having an amplitude proportional to the output of said tone channel and tending to increase in a second sense opposite to said first sense when the input to said tone channel is increased whereby it is effective to control the function circuit in a second manner, whereby to render said output network responsive to one of said channels only after the application of an input from the input circuit to said one channel for a predetermined period of time.

10. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and a time delay network having the output thereof connected to the output terminal of said control network, the like terminals of said rectifiers also being connected to said first input terminal of said output network and to the input of said time delay network, the other terminal of one of said rectifiers being connected to said second input terminal of said output network and the other terminal of the other of said rectifiers being connected to said output terminal of said output network, said noise channel being operative when noise is applied thereto from the input circuit to provide an input to said output network that causes operation of said output network to provide after a predetermined time delay a first output voltage therefrom having an amplitude proportional to the output of said noise channel and tending to increase in a first sense when the input to said noise channel is increased whereby it is effective to control the function circuit in a first manner, said tone channel being operative when the control tone is applied to the input circuit to provide an input to said output network that causes operation of said output network to provide after another predetermined time delay a second output voltage therefrom having an amplitude proportional to the output of said tone channel and tending to increase in a second sense opposite to said first sense when the input to said tone channel is increased whereby it is effective to control the function circuit in a second manner, whereby to render said output network responsive to one of said channels only after the application of an input from the input circuit to said one channel for a predetermined period of time.

11. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and a cathode and a time delay network having the output thereof connected to the output terminal of said control network, the cathodes being connected to each other and also being connected to said first input terminal of said output network and to the input of said time delay network, the anode of said first of said rectifiers being connected to said second input terminal of said output network and the anode of the second of said rectifiers being connected to said output terminal of said output network, said noise channel being operative when noise is applied thereto to provide an input to said output network to cause operation of said output network to provide a first output voltage therefrom having an amplitude proportional to the output of said noise channel and tending to increase in a first sense when the input to said noise channel is increased whereby it is effecitve to control the function circuit in a first manner, said tone channel being operative when the control tone is applied to the input circuit to provide an input to said output network that causes operation of said ouput network to provide after a predetermined time delay a second output voltage therefrom having an amplitude proportional to the output of said tone channel and tending to increase in a second sense opposite to said first sense when the input to said tone channel is increased whereby it is effective to control the function circuit in a second manner, whereby to render said output network responsive to said tone channel only after the application of a control tone from the input circuit to said tone channel for a predetermined period of time.

12. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and a cathode and a time delay network having the output thereof connected to the output terminal of said control network, the anodes being connected to each other and also being connected to said second input terminal of said output network and to the input of said time delay network, the cathode of the first of said rectifiers being connected to said first input terminal of said output network and the cathode of the second of said rectifiers being connected to said output terminal of said output network, said noise channel being operative when noise is applied thereto to provide an input to said output network that causes operation of said output network to provide after a predetermined time delay a first output voltage therefrom having an amplitude proportional to the output of said noise channel and tending to increase in a first sense when the input to said noise channel is increased whereby it is effective to control the function circuit in a first manner, said tone channel being operative when the control tone is applied to the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner, whereby to render said output network responsive to said noise channel only after the application of an input from the input circuit to said noise channel for a predetermined period of time.

13. A tone control circuit for use in a communication receiver including an input circuit adapted to have both a control tone and noise therein and a function circuit to be controlled in response to the presence of the control tone in the input circuit, a noise channel including a first filter network and having an input terminal adapted to be connected to the associated input circuit and an output terminal, a tone channel including a second filter network and having an input terminal adapted to be connected to the associated filter circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and to a point in said output network that can fluctuate with respect to ground potential, the first input terminal of said output network being connected to one of the terminals of one of said rectifiers, the other terminal of the other of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

14. The tone control circuit set forth in claim 13, wherein said first filter network in said noise channel passes substantially all frequencies over a broad band including the control tone, and said second filter network in said tone channel passes substantially only the control tone.

15. A tone control circuit for use in a communication receiver including an input circuit adapted to have both a control tone and noise therein and a function circuit to be controlled in response to the presence of the control tone in the input circuit, a noise channel including a first filter network and having an input terminal adapted to be connected to the associated input circuit and an output terminal, a tone channel including a second filter network and having an input terminal adapted to be connected to the associated filter circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other and at a point which can fluctuate in potential with respect to ground potential, the first input terminal of said output network being connected to one of the terminals of one of said rectifiers, the other terminal of the other of said rectifiers being connected to said second input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

16. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said channels and an output terminal adapted to be connected to the associated function circuit to be controlled, said output network including two rectifiers having one pair of the like terminals thereof connected to each other, the like terminals of said rectifiers also being connected to the first input terminal of said output network, the other terminal of one of said rectifiers being connected to said second input terminal of said input network, said noise channel being operative when noise is present in the input circuit to provide an input to said output network that causes operation of said output network to provide a first output voltage therefrom having an amplitude porportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner, and a time delay circuit in said output network operative to render said output network responsive to one of said channels only after the application of an input from the input circuit to said one channel for a predetermined period of time, said time delay circuit being adjustable to adjust the length of said predetermined period of time.

17. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the associated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and a cathode, said cathodes being connected to each other and to said first input terminal of said output network, the anode of the first of said rectifiers being connected to said second input terminal to said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel is increased whereby it is effective to control the function circuit in a second manner.

18. A tone control circuit for use in a communication receiver including an input circuit adapted to have both a control tone and noise therein and a function circuit to be controlled in response to the presence of the control tone in the input circuit, said control circuit comprising a noise channel having an input terminal adapted to be connected to the assocated input circuit and an output terminal, a tone channel having an input terminal adapted to be connected to the associated input circuit and an output terminal, an output network having first and second input terminals respectively connected to the output terminals of said noise and tone channels respectively and an output terminal adapted to be connected to the associated function circuit to be controlled, said output network including two rectifiers each having an anode and cathode, said anodes being connected to each other and also being connected to said second input terminal of said output network, the cathode of the first of said rectifiers being connected to said first input terminal of said output network, said noise channel being operative when noise is present in the input circuit to provide an input to said output network that causes operation of said output network to provide a first output voltage therefrom having an amplitude proportional to the output of said noise channel and tending to increase in a first sense when the input to said noise channel is increased whereby it is effective to control the function circuit in a first manner, said tone channel being operative when the control tone is present in the input circuit to provide an input to said output network that causes operation of said output network to provide a second output voltage therefrom having an amplitude proportional to the output of said tone channel and tending to increase in a second sense opposite to said first sense when the input to said tone channel in increased whereby it is effective to control the function circuit in a second manner.

References Cited in the file of this patent

UNITED STATES PATENTS

| | | |
|---|---|---|
| 2,259,532 | Nicholson | Oct. 21, 1941 |
| 2,802,939 | Klehfoth | Aug. 13, 1958 |
| 2,834,879 | Bauman | May 13, 1958 |
| 2,852,622 | Fedde et al. | Sept. 16, 1958 |
| 2.888.527 | Follensbee et al. | May 26, 1959 |
| 2,959,673 | Magnuski | Nov. 8, 1960 |